J. L. MARTIN.
LAWN MOWER.
APPLICATION FILED MAR. 20, 1916.

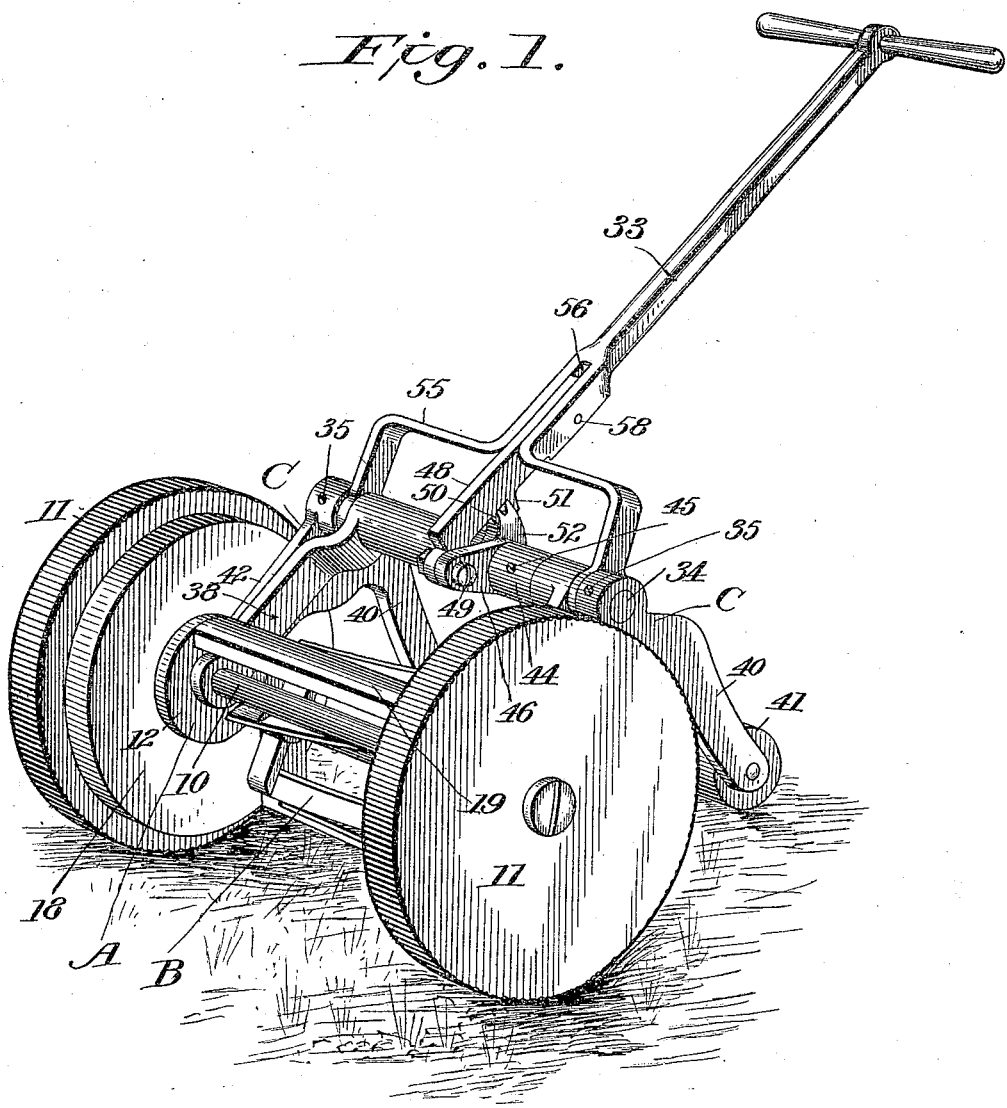

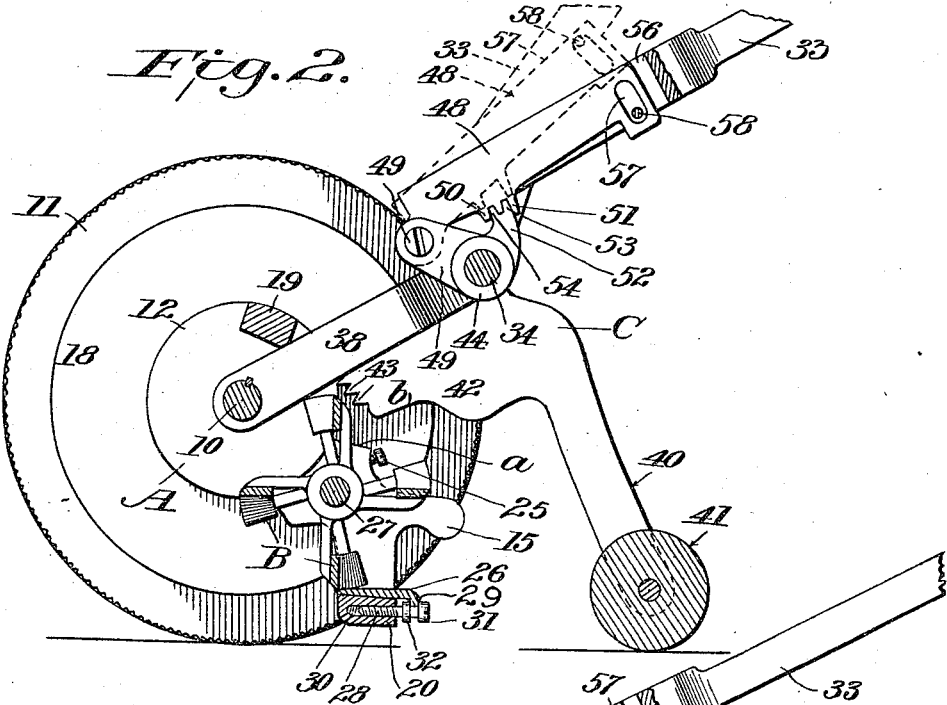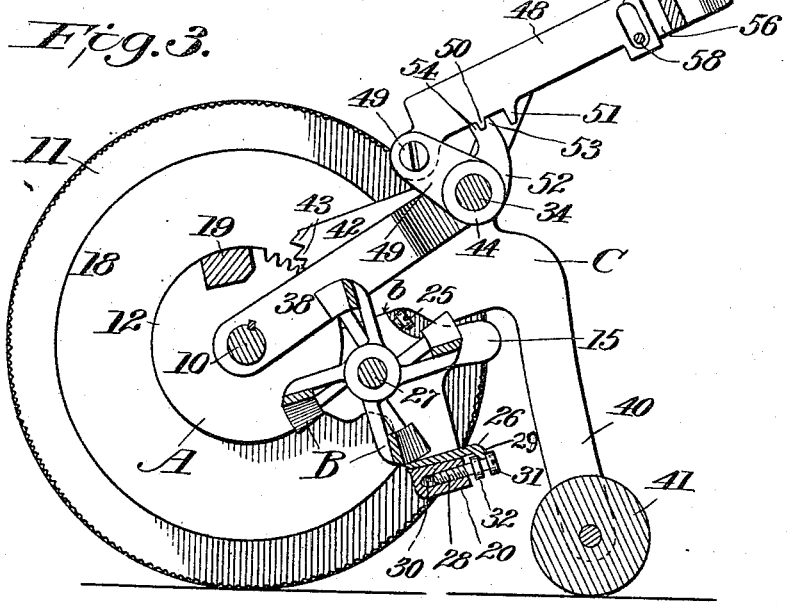

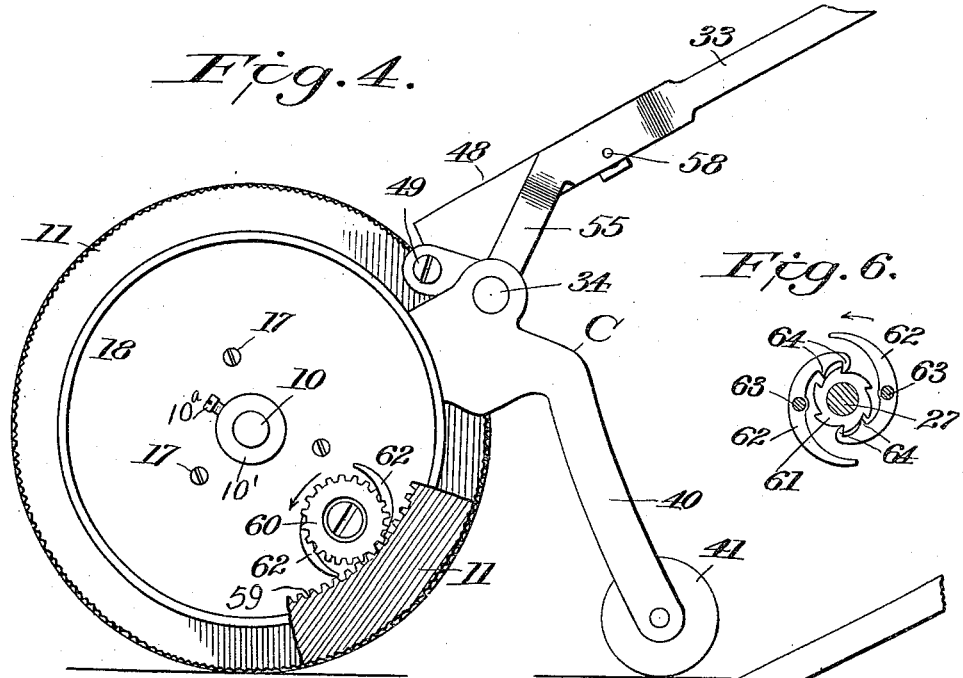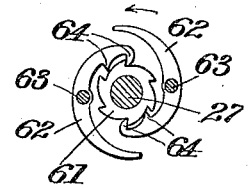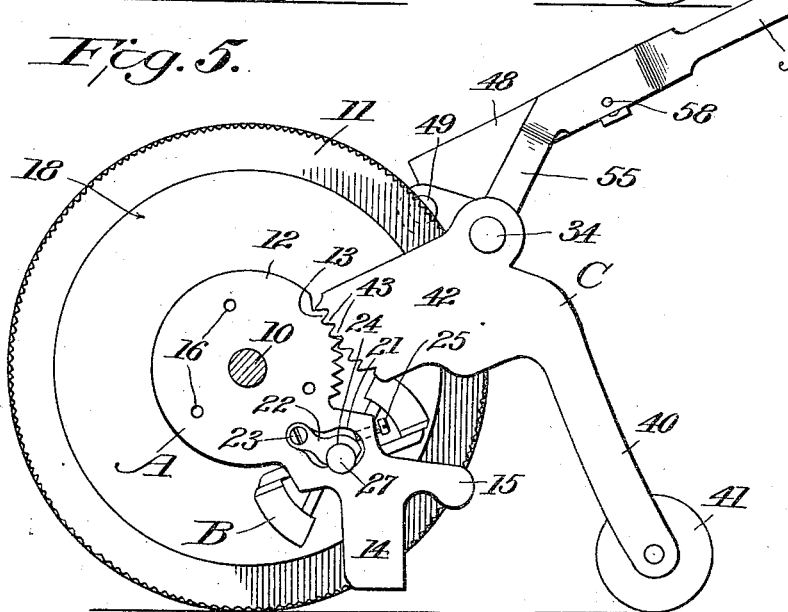

1,184,553.

Patented May 23, 1916.
4 SHEETS—SHEET 4.

Inventor
James L. Martin
By
Attorney

UNITED STATES PATENT OFFICE.

JAMES L. MARTIN, OF CROWELL, TEXAS.

LAWN-MOWER.

1,184,553.  Specification of Letters Patent.  Patented May 23, 1916.

Application filed March 20, 1916. Serial No. 85,436.

*To all whom it may concern:*

Be it known that I, JAMES L. MARTIN, a citizen of the United States, residing at Crowell, in the county of Foard and State of Texas, have invented certain new and useful Improvements in Lawn-Mowers, of which the following is a specification.

This invention relates to lawn mowers.

One object is to provide a lawn mower embodying suitable drive wheels and an adjustable cutting mechanism operatively associated therewith and which may be quickly adjusted and held in adjusted positions by means releasable by the propelling handle, whereby both the adjusting means and the holding means are controllable by said handle.

Another object resides in the provision of a lawn mower whose cutting mechanism may be easily, readily and positively adjusted and effectually maintained in adjusted positions to cut grass of different lengths without the necessity of the operator stooping.

A still further object is to provide a lawn mower embodying drive wheels, a cutting mechanism operatively connected to the drive wheels and adjustable with relation thereto, a roller supported in the rear of the drive wheels and having operative connection with the mower and with the cutting mechanism to adjust the latter upon a movement of the drive wheels toward and away from said roller.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

Figure 7:
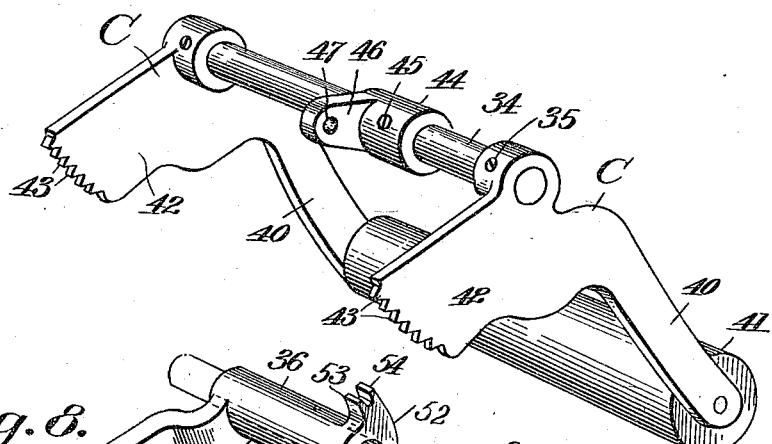
Figure 8:
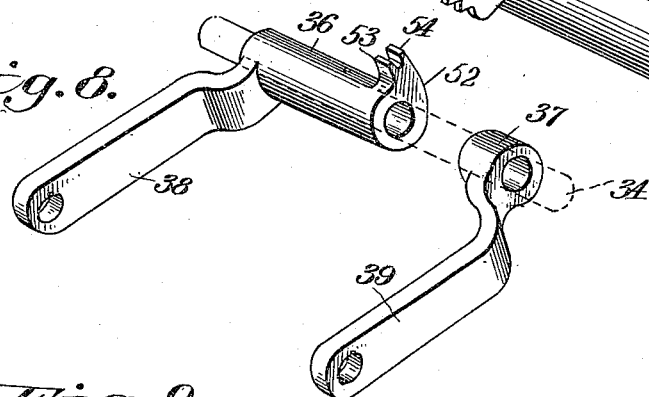
Figure 9:
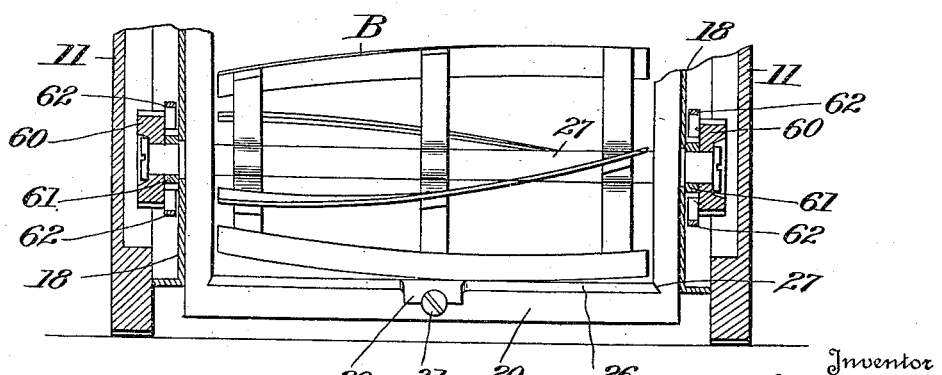
Figure 9A:
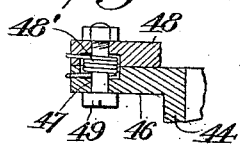

In the drawings: Figure 1 is a perspective view of the invention. Fig. 2 is a central vertical transverse sectional view through the mower illustrating the cutting mechanism in its lowered position. Fig. 3 is a central vertical transverse sectional view through the mower illustrating the cutting mechanism in its adjusted position for cutting grass or other material of relatively long length. Fig. 4 is a side elevation of the mower, partly in section, illustrating the gear mechanism. Fig. 5 is a vertical transverse sectional view through the mower along the inner side of the near drive wheel. Fig. 6 is a detail view of the clutch mechanism of the driving means. Fig. 7 is a detail perspective view of the bell crank levers operatively connected together. Fig. 8 is a detail perspective view of the link and bearing connections between the main drive shaft and the shaft to which the bell crank levers are connected. Fig. 9 is a fragmentary view partly in elevation and partly in section illustrating the gear and clutch mechanisms. Fig. 9$^a$ is a detail fragmentary horizontal sectional view through the pivotal connection of the locking lever.

Referring now more particularly to the accompanying drawings, the reference character A indicates a frame which is swingingly mounted on the axle 10 of the mower and on which axle the drive wheels 11 are journaled. These drive wheels may be of any suitable character and their peripheries are preferably cross-ribbed or serrated to form traction surfaces.

The frame A referred to may be of various shapes but, in the embodiment of the invention illustrated in the accompanying drawings, it is shown as consisting of end plates with suitable connections between the same. The end plates are formed alike, each consisting of an upper substantially circular portion 12 having teeth 13 and a depending portion 14 from which latter extends a rearward projection 15, the latter being for ornamental purposes rather than for the performance of any particular function, although in the event of wear between the shoulders *a* and *b* of the frame A and the bell crank levers C the said projection would perform the function of a stop by reason of engagement with the lower edge of the rear portion of the arms 42 of the bell crank levers C. The upper circular portions 12 of the frame A have apertures 16 to receive screws or other suitable fastenings 17 adapted to have working fit in similarly formed apertures in the respective cup-shaped casings 18 disposed adjacent the inner faces of the drive wheels 11 to inclose the gear and clutch mechanisms hereinafter described. Each end of the frame A may be formed integral with the respective gear casing 18, if desired, and in the manufacture of the mower said frame and said casings will be preferably formed in one piece rather than in separate pieces. Said casings may be held against outward movement on the main shaft 10 by means of suitable collars 10′ secured to said shaft by means of suitable fastenings 10ᵃ. The connections between the end plates of the frame A are preferably in the form of upper and lower cross-pieces 19 and 20, the former connecting the substantially circular portions of the frame and the latter preferably connecting the depending portions 14 at the lower ends of the latter.

Bearing openings 21 are formed in the end plates of the frame A between the connecting pieces 19 and 20. A movable bearing block 22 is disposed in each of these openings 21, the same being pivoted at 23. Each bearing block 22 has a recessed portion 24 and screws or other adjustable elements 25 are operatively connected to the end plates for engagement with the adjustable bearing blocks 22 for the purpose of adjusting the same.

The cutting mechanism in the present instance may consist of a rotary cutter B and a shear blade 26, each being carried by the aforesaid frame A. The rotary cutter B may be of any suitable character and it may be keyed in any suitable manner on its operating shaft 27. The operating shaft 27 projects at its ends into the aforesaid openings 21 in the end plates of the frame A and is held in the recessed portions 24 of the bearing blocks 22 and adjustably supported therein by the adjustable bearing blocks 22 and the elements 25 which co-act with the latter, so that, in the event of looseness incident to continued use or wear, the rotary cutter may be readily adjusted for effectual coaction with the shear blade 26.

To provide for further adjustment between the rotary cutter B and the shear blade 26, the latter is adjustably mounted on the frame A, and, as shown, it is adjustably slidable on the aforesaid connecting-piece 20. To this end, the inner faces of the end plates of the frame A adjacent the ends of the connecting piece 20 may have beveled grooves 27 to receive the correspondingly beveled ends of the shear blade 26, whereby the shear blade 26 may be slidably adjusted in the beveled grooves 27 by the manipulation of an adjusting screw or other suitable element 28 rotatably supported in the downwardly turned lug 29 of the shear blade 26 and in a screw threaded socket 30 formed in the connecting piece 20. The screw 28 has a head 31 and it also has a collar 32 spaced from the head. The head operates adjacent the outer face of the lug 29 while the collar 32 operates adjacent the inner face of said lug so that upon manipulation of the screw 28 in any suitable manner the shear blade 26 is caused to slide inwardly or outwardly on the connecting piece 20 according to the direction of rotation of the screw 28 to raise and lower the shearing blade to the rotary cutter.

The frame A which carries the cutting mechanism is adapted to be raised and lowered by a swinging movement on the main shaft 10 for the purpose of elevating or lowering the cutting mechanism so as to cut grass or other material of different lengths.

Reference to Fig. 2 will show the cutting mechanism illustrated in position for cutting grass of relatively short length. By referring to Fig. 3, the cutting mechanism will be seen positioned for cutting grass or other material of relatively long length. These adjustments may be made in various ways, but it is the purpose of my invention to effect an automatic adjustment of the cutting mechanism for the purpose stated without the necessity of removing and replacing fastenings and also obviating the necessity of the manipulator stooping to accomplish the purpose.

To the ends just alluded to, I have illustrated one embodiment of the invention wherein I effect the aforesaid adjustments of the cutting mechanism through the instrumentality of bell crank levers C which are secured to the ends of a shaft 34 by means of keys 35. This shaft 34 is supported above the plane of the main drive shaft 10 in suitable bearings 36 and 37 of the respective links 38 and 39 fixedly secured on the axle 10 and which may be said to tie the bell crank levers C, the shaft 34 and other parts carried by the bell crank levers to the mower.

The arms 40 of the bell crank levers C have a sward roller 41 of the bell crank levers C their lower ends. This roller in addition to other characteristics, performs the function of a guard-bar adjacent the cutting mechanism. The arms 42 of the bell crank levers C are of substantially segmental form and have teeth 43 adapted to mesh with the aforesaid teeth 13 on the end plates of the frame A so that upon an inward and outward movement of the arms 40 of the bell crank levers C, the segmental shaped arms 42 of the bell crank levers C, by virtue of the teeth 43 in mesh with the teeth 13 on the end plates of the frame A, cause said frame to be adjusted, that is, in the present instance swingingly raised and lowered on the main shaft 10.

A collar 44 is fixedly secured on the aforesaid shaft 34 by a key 45 or otherwise. This collar 44 is arranged between the bearings 36 and 37 and it is provided with a lug 46 having an aperture 47 in its outer end. A locking lever 48 is pivotally connected to the lug 46 by a suitable pivot 49 passed through the aperture 47 of the lug 46. This locking lever is provided on its under side with spaced teeth 50 and 51 adapted to cooperate with a keeper lug 52 on the bearing 36, the latter having teeth 53 and 54, the lugs 46 and 52 being arranged adjacent each other, as shown.

The propelling handle 33 of the mower, as illustrated herein, is provided with a bail portion 55 whose legs are swiveled on the aforesaid shaft 34 adjacent the ends of the latter, being located between the bell crank levers C and the bearings 36 and 37, there being a recess 56 formed in the handle 33 to receive the outer end of the locking lever 48. This locking lever 48 is preferably spring controlled, that is, it has a concealed spring 48' at its pivoted end to throw the same normally downward and at its opposite end it is provided with a transverse slot 57 to receive a pin 58 extending transversely through the handle and through said recess 56 of the handle, providing a loose connection for play between the outer end of the locking lever and the handle 13 for a purpose presently apparent.

The gearing mechanism may be of any desired arrangement. As shown, each drive wheel 11 is hollow and provided with an internal annular gear 59 to drive the pinions 60 on the ends of the rotary cutter shaft 27.

Clutches coöperate with the pinions 60, each clutch embodying a clutch member 61 keyed on the rotary cutter shaft 27 between the inner faces of the respective cup-shaped casing 18 and the inner faces of the corresponding pinions 60. Clutch dogs 62 are pivoted on the inner face of each pinion 60 by means of suitable pivots 63, each dog being preferably substantially semi-circular and each having a plurality of teeth 64 adapted to engage with the teeth of the clutch member 61 under the influence of centrifugal action as the mower is pushed over the sward so as to operate the rotary cutter. On backward movement of the mower, the teeth 64 simply ride over the teeth of the clutch member 61.

When the mower is pushed forward over the sward and, assuming that the mower is being operated to cut grass or other material of relatively short length, the parts will be positioned as illustrated in Figs. 1 and 2, in which position it will be noted that the connecting piece 19 of the end plates of the frame A is in engagement with the supporting links 38 and 39 forming a stop which coacts with the locking lever 48 to limit downward movement of the frame A. If it be desired to adjust the cutting mechanism for the purpose of cutting grass or other material of longer length it may be done in several ways. One way is for the operator to place one foot against the sward roller 41 and, by a direct pull on the handle 33 toward him, longitudinally of the axis of the handle, the entire machine will be raised on the sward roller 41, said sward roller acting as a fulcrum, with the result that the locking lever 48 will pass rearwardly and downwardly through the bottom of said recess 56 until the upper end of the slot 57 in the locking lever engages the pin 58 in the handle 33. A continued straight rearward pull on the handle 33 causes the mower to be further lifted on the roller 41 and a consequent continued rearward and downward movement of the locking lever 48 in the recess 56 which will cause the teeth 50 and 51 on the locking lever to be lifted from embracing relation with the lug 52 on the bearing 33 against the action of its spring controlling means 48'. Immediately on the release of the locking lever 48 from the lug 52 the weight of the elevated body of the mower causes the same to swing downward under the influence of gravity, the teeth 13 on the end plates of the frame A riding the teeth 43 on the segmental shaped arms 42 of the bell crank levers C, causing the rear end of the frame A to swing upwardly on the main shaft 10 as the body of the mower swings downward by gravity. The upward swing of the frame A is practically instantaneous and is arrested or stopped by the shoulders a of the frame A engaging the under side portions b of the segmental arms 42 of the bell crank levers C.

As before stated, the projection 15 of the frame A may engage the rear under side portions of the arms 42 of the bell crank levers C to form stops in the event that the shoulders a and b of the frame A and bell crank levers C, respectively, should become worn or wear away incident to frequent use of the mower.

Immediately upon the teeth 50 and 51 being released from embracing relation with the lug 52 on the bearing 36, the spring 48' causes the locking lever 48 to assume its normal position and quickly snap its tooth 50 between the teeth 53 and 54 of the keeper lug 52, which latter was slightly advanced on inward movement of the bell crank levers C, thereby locking the frame A and the cutting mechanism in the elevated position shown in Fig. 3. The upward swing of the frame A and the cutting mechanism supported thereon and the interchanging relation of the teeth between the locking lever 48 and the teeth of the keeper lug 52 is practically instantaneous.

The adjustment of the cutting mechanism just referred to may be accomplished without raising the mower on the sward roller 41. The operator may raise the handle 33 to lift and hold the teeth 50 and 51 out of embracing relation with the keeper lug 52 and with his foot force the roller 41 toward the drive wheels, thereby advancing the bell crank levers C and the keeper lug 52 slightly toward the drive wheels. The teeth 43 of the arms 42 of the bell crank levers C being in mesh with the teeth 13 on the end plates of the frame A will cause the frame A to swing upwardly on the main shaft 10, when the bell crank levers C are swung under the action of movement of the sward roller 41 toward the drive wheels. When the shoulders *a* of the frame A engage the shoulders *b* of the arms 42 of the bell crank levers C, the handle 33 may be lowered to lower the locking lever 48 so that the tooth 50 thereof may engage between the teeth 53 and 54 of the slightly advanced keeper lug 52 to lock the frame A and the cutting mechanism B in the elevated or adjusted position for cutting grass or other material of relatively long length.

Another way in which this adjustment of the cutting mechanism may be effected is to lift the mower on the sward roller 41 as a fulcrum and, by giving a forward jerk to the handle 33 longitudinally of the axis of the latter, the adjustment may be effected. Under this jerking action for adjustment purposes, the locking lever 48 is actuated against the tension of its spring 48' and it may be noted that it is not necessary for the operator to place one foot against the sward roller 41 when the adjustment is effected under the influence of a jerk on the handle 33.

It may be noted that when the adjustments just referred to have taken place, that is, when the cutting mechanism has been lifted to the position shown in Fig. 3 easy and ready access may be had to the adjusting screw 28, the same and the connecting piece 20 having been elevated to a position whereby the same may be easily reached over the sward roller 41. This free access to the screw 28 for the purpose of adjusting the shear blade 26 will be apparent by reference to Fig. 3 and a comparison therewith of Fig. 2, in which latter figure it will be seen that the adjusting screw 28 is not of as easy access as when the parts are adjusted to the position shown in Fig. 3.

To quickly adjust the cutting mechanism from the position shown in Fig. 3 to that of Figs. 1 and 2 to cut relatively short grass or other material, it is not necessary to elevate the body of the mower on the sward roller 41 as a fulcrum. It is simply necessary to lift the handle 33 to raise the pin 58 into engagement with the upper end of the slot 57 in the locking lever 48 and by a continued upward movement of the lever 33 the locking lever 48 is lifted on its pivot against the action of the spring 48' to lift the tooth 50 from between the teeth 53 and 54 of the keeper lug 52, when the frame A and consequently the cutting mechanism will be released so that a slackening hold on the handle 33 will permit the frame A and the cutting mechanism to swing by gravity until the supporting links 38 and 39 come into contact with the connecting piece 19 which stops and prevents further lowering movement of the frame A and the cutting mechanism carried thereby. The lowering of the frame A causes the teeth 13 of the end plates on the frame A to ride on the teeth 43 of the arms 42 of the bell crank levers C which throws the arms 40 of the bell crank levers, the keeper lug 52, and the roller 41 rearwardly. The handle 33 is then lowered and the teeth 50 and 51 of the locking lever embrace the keeper lug 52, as shown in Fig. 2, locking the frame A and the cutting mechanism B in their lowered positions to cut grass or other material of relatively short length. The adjustment of the cutting mechanism from the position in Fig. 3 to that of Fig. 2 is practically instantaneous as in the case when the frame A and cutting mechanism are elevated for cutting grass or other material of relatively long length. Thus, the adjustments of the cutting mechanism are under the control of the handle 33. In other words, by manual manipulation of the handle 33, the locking device 48—52 is actuated and an automatic adjustment of the cutting mechanism follows.

From the foregoing it will be seen that the adjustments herein referred to are made easily, quickly and automatically effected under the control of the propelling means. It will be apparent that in making the adjustments there need be little or no interruption in the mowing process and that all of the operations are effected without throwing the driving or gearing mechanism out of coöperative relation. It will be noted that the adjusting actions are not only quickly made and practically instantaneous, but that the adjustments are positive in action and that the machine as a whole is simple, durable, and efficient in the performance of the functions herein ascribed to the same.

What is claimed is:

1. A lawn mower comprising drive wheels, a cutting mechanism operatively connected to the drive wheels, means for adjusting the height of the cutting mechanism, means for holding the cutting mechanism in adjusted positions, and a handle having operative connection with the adjusting means and with said holding means and operable to control the operation of both of said means.

2. A lawn mower comprising drive wheels, a cutting mechanism supported between the drive wheels, operative connections between the drive wheels and the cutting mechanism to operate the latter, means for adjusting the cutting mechanism to cut grass of different lengths, a propelling handle operatively connected to the mower, and connections between the handle and the cutting mechanism controlled by the handle to effect adjustments of the cutting mechanism and to hold the cutting mechanism in adjusted positions.

3. In a lawn mower, an axle, drive wheels on the axle, a frame swingingly mounted on the axle for adjustment between the drive wheels and having toothed portions, a cutting mechanism supported by said frame, operative connections between the drive wheels and the cutting mechanism to operate the latter, bell crank levers having arms provided with teeth to mesh with the toothed portions of said frame to adjust the latter, a shaft connecting the bell crank levers to which the latter are fixed, a sward roller connected to said bell crank levers, connections between the axle of the ground wheels and said shaft to tie the latter and the bell crank levers to the mower and in which said shaft is journaled, a propelling handle swingingly connected to said shaft, a locking means between said shaft and the propelling handle to lock said frame and cutting mechanism in adjusted positions and which is unlocked to permit adjustment of the frame and cutting mechanism under the action of the propelling handle.

4. A lawn mower comprising drive wheels, a cutting mechanism operatively connected to the drive wheels, means for adjusting the height of the cutting mechanism, means for holding the cutting mechanism in adjusted positions, and a handle operatively connected to the adjusting means and to said holding means, both of which means are releasable by a pull on the handle in a direction substantially longitudinally of the axis of the handle to adjust the cutting mechanism.

5. A lawn mower comprising drive wheels, an axle on which the drive wheels are mounted, a cutting mechanism pivotally supported from said axle, operative connections between the drive wheels and the cutting mechanism to operate the latter, a propelling handle, and connections between the handle and the cutting mechanism whereby the handle may be operated to control the pivotal movement of the cutting machanism and the operation of said controlling connections.

6. A lawn mower comprising drive wheels, an axle on which the drive wheels are mounted, a cutting mechanism swingingly supported from said axle, a gear mechanism for operating the cutting mechanism, a propelling handle operatively connected to the cutting mechanism, and means for locking the cutting mechanism against swinging movement, said handle being operable to operate said locking means and permit swinging movement of the cutting mechanism.

7. A lawn mower comprising drive wheels, an axle on which the drive wheels are mounted, a cutting mechanism swingingly suspended from said axle, operative connections between the drive wheels and the cutting mechanism, bell crank levers supported on the mower and operatively connected to the cutting mechanism to swing the cutting mechanism to adjusted positions, and means for locking the cutting mechanism in adjusted positions.

8. A lawn mower comprising drive wheels, an axle on which the drive wheels are mounted, a frame swingingly suspended from the axle, a cutting mechanism carried by said frame, means for operating the cutting mechanism, means for swinging the frame and cutting mechanism to adjusted positions, means for locking the frame and cutting mechanism in adjusted positions, a propelling handle, and means whereby upon actuation of the propelling handle the locking means may be actuated to permit swinging movement of the frame and cutting mechanism.

9. In a lawn mower, drive wheels, an axle on which the drive wheels are mounted, a frame swingingly mounted on the axle, a cutting mechanism supported on the frame, operative connections between the drive wheels and the cutting mechanism, bell crank levers having operative connection with the axle and with said frame to swing the frame and the cutting mechanism to raise and lower the latter to adjust the same to cut grass of different lengths, and means for locking the frame and cutting mechanism in adjusted positions.

10. A lawn mower comprising drive wheels, a cutting mechanism operatively connected to the drive wheels, bell crank levers supported on the mower and having operative connection with the cutting mechanism to swing the cutting mechanism to adjusted positions, a sward roller supported by the bell crank levers, and means for locking the cutting mechanism in adjusted positions.

11. In a lawn mower, drive wheels, an axle on which the drive wheels are mounted, a frame swingingly mounted on the axle, a cutting mechanism supported on the frame, operative connections between the drive wheels and the cutting mechanism, bell crank levers having operative connection with the axle and with said frame to swing the frame and the cutting mechanism to raise and lower the latter to adjust the same to cut grass of different lengths, means for locking the frame and cutting mechanism in adjusted positions, and means to unlock the locking means to permit movement of the bell crank levers to adjust the frame and the cutting mechanism.

12. A lawn mower comprising drive wheels, a cutting mechanism operatively connected to the drive wheels, levers supported on the mower for operation to adjust the height of the cutting mechanism, means for holding the levers in different positions to maintain the cutting mechanism in adjusted positions, a connection between the levers, and a handle operatively connected to said levers and to said holding means and operable to control the operation of the levers and said holding means.

13. In a lawn mower, drive wheels, an axle on which the drive wheels are mounted, a frame swingingly mounted on the axle, a cutting mechanism supported on the frame, operative connections between the drive wheels and the cutting mechanism, bell crank levers having operative connection with the axle and with said frame to swing the frame and the cutting mechanism to raise and lower the latter to adjust the same to cut grass of different lengths, means for locking the frame and cutting mechanism in adjusted positions, a propelling handle having connection with the mower and with said locking means to actuate the latter to permit operation of the bell crank levers and a consequent swinging movement of the frame and cutting mechanism.

14. A lawn mower comprising drive wheels, an axle on which the drive wheels are mounted, a cutting mechanism movably supported on the axle, operative connections between the drive wheels and the cutting mechanism, bell crank levers having operative connection with the axle, operative connections between the bell crank levers and the cutting mechanism to raise and lower the latter, a shaft connection between the bell crank levers, means having connection with said shaft for locking the bell crank levers against movement and for locking the cutting mechanism in different positions, a roller carried by the bell crank levers, and a propelling handle connected to said shaft and operatively connected to said locking means whereby upon maintaining the roller relatively immovable and by manipulation of the handle said locking means will be actuated to permit the bell crank levers to raise and lower the cutting mechanism.

15. A lawn mower comprising drive wheels, an axle on which the drive wheels are mounted, a frame movably supported on the axle, a cutting mechanism supported on said frame, means for operating the cutting mechanism, bell crank levers located at the rear of the mower, a shaft connection between the bell crank levers, a supporting connection between said shaft and said axle, operative connections between the bell crank levers and said frame to raise and lower the latter and also the cutting mechanism carried thereby, means having connection with said shaft for locking the bell crank levers against movement and for locking the frame and cutting mechanism in different position, a roller carried by the bell crank levers, and a propelling handle connected to said shaft and operatively connected to said locking means whereby upon maintaining the roller relatively immovable and by manipulation of the handle said locking means will be actuated to permit the bell crank levers to move to raise and lower the frame and the cutting mechanism.

16. A lawn mower comprising drive wheels, an axle on which the drive wheels are mounted, a frame swingingly supported on the axle, a cutting mechanism supported on said frame, operative connections between the drive wheels and the cutting mechanism, the frame having toothed portions, bell cranks levers located at the rear of the mower, a shaft secured to the bell crank levers, means for connecting said shaft to said axle so as to support the bell crank levers, the latter having toothed portions meshing with the toothed portions of said frame to swing the latter and the cutting mechanism on movement of the bell crank levers, means having connection with said shaft for locking the bell crank levers against movement and for locking the frame and cutting mechanism in different positions, a roller carried by the bell crank levers, and a propelling handle connected to said shaft and operatively connected to said locking means whereby upon maintaining the roller relatively immovable and by manipulation of the handle said locking means will be actuated to permit the bell crank levers to raise and lower the frame and the cutting mechanism.

17. A lawn mower comprising drive wheels, an axle on which the drive wheels are mounted, a cutting mechanism adjustably supported on the axle, driving connections between the drive wheels and the cutting mechanism, bell crank levers located in the rear of the mower and having operative connection with the cutting mechanism to adjust the latter to cut grass of different lengths, a shaft connection between the bell crank levers to which the latter are rigidly secured, supporting connections between the axle and said shaft, means having connection with said shaft for locking the bell crank levers against movement and for locking the cutting mechanism in adjusted positions, a roller carried by the bell crank levers, and a propelling handle movably connected to said shaft and having loose connection with said locking means to trip the latter, whereby upon maintaining the roller relatively immovable and by movement of the handle said locking means will be actuated to permit the bell crank levers to adjust the cutting mechanism.

18. In a lawn mower, drive wheels operatively connected together, a cutting mechanism adjustably mounted between the drive wheels, operating connections between the drive wheels and the cutting mechanism, means for automatically adjusting the cutting mechanism to cut grass of different lengths, means for locking the cutting mechanism in adjusted positions, and a propelling handle having operative connection with the mower and with the locking means to trip the latter so that upon manual manipulation of the handle the locking means will be released and the cutting mechanism automatically adjusted.

19. In a lawn mower, drive wheels operatively connected together, a cutting mechanism adjustably mounted between the drive wheels, operating connections between the drive wheels and the cutting mechanism, means for automatically adjusting the cutting mechanism to cut grass of different lengths, means for locking the cutting mechanism in adjusted positions, and a propelling handle having operative connection with the mower and with the locking means to trip the latter so that upon manual manipulation of the handle the locking means will be released and the cutting mechanism automatically adjusted, said locking means operating automatically to lock the cutting mechanism in an adjusted position subsequent to manipulation of the handle.

20. In a lawn mower, drive wheels operatively connected together, a cutting mechanism adjustably mounted between the drive wheels, operating connections between the drive wheels and the cutting mechanism, means for automatically adjusting the cutting mechanism to cut grass of different lengths, means for locking the cutting mechanism in adjusted positions, and a propelling handle having operative connection with the mower and with the locking means so that by a pull on the handle the locking means is tripped and the cutting mechanism automatically adjusted.

21. In a lawn mower, drive wheels operatively connected together, a cutting mechanism adjustably mounted between the drive wheels, operating connections between the drive wheels and the cutting mechanism to operate the latter, bell crank levers connected to the mower for swinging movement and operatively connected to the cutting mechanism to adjust the latter to different heights, a sward roller carried by the bell crank levers in the rear of the drive wheels, a shaft connection between the bell crank levers, a connection between said shaft and the axle, a propelling handle swingingly connected to said shaft, a locking device connected to said shaft and to the handle to lock the cutting mechanism in adjusted positions, the connection between the locking device and the handle permitting the latter to trip the former, whereby the drive wheels and cutting mechanism may be elevated off the ground on said roller as a fulcrum and the locking device actuated to release the same to permit the mower to lower by gravity and the bell crank levers through their operative connection with the cutting mechanism to adjust the latter, the locking device subsequently automatically operating to lock the cutting mechanism in adjusted position.

22. In a lawn mower, an axle, drive wheels on the axle, a frame swingingly mounted on the axle for adjustment thereon, the frame having bearing openings in its side members, a cutting mechanism including a rotary cutter and a shearing blade, the shearing blade being adjustably mounted on the frame and the rotary cutter having its axis mounted in said bearing openings, a pivoted member in each of said openings and having a recess receiving the rotary cutter axis, means to adjust the pivoted bearing members on the rotary cutter axis, and operative connections between the drive wheels and the rotary cutter.

23. In a lawn mower, an axle, drive wheels on the axle, a frame swingingly mounted on the axle, a cutting mechanism supported by the frame, operative connections between the drive wheels and the cutting mechanism to operate the latter, spaced bell crank levers located in the rear of the mower, a shaft fixedly connected to the bell crank levers and located in a plane above the axis of said axle, connections between said shaft and said axle for the support of said shaft and the bell crank levers, a roller carried by the bell crank levers, and connections between the bell crank levers and the frame for adjusting the latter.

24. A lawn mower comprising drive wheels, a cutting mechanism operatively connected to the drive wheels, means for adjusting the height of the cutting mechanism, a lock keeper supported on the mower, a locking lever pivotally supported on the mower to co-act with said keeper to hold the cutting mechanism in adjusted positions, and a propelling handle movably connected to the mower and having connection with the locking lever, said handle controlling both the adjusting means and said locking lever.

25. A lawn mower comprising drive wheels, a frame mounted to swing between the drive wheels, a cutting mechanism supported by said frame and operatively connected to the drive wheels, means for swinging said frame to adjust the height of the cutting mechanism, a keeper supported on the mower, a locking lever supported on the mower to coact with said keeper to hold the cutting mechanism in adjusted positions, and a propelling handle movably connected to the mower and having connection with the locking lever, said handle controlling the swinging movement of said frame and the locking lever.

26. A lawn mower including drive wheels, a cutting mechanism operatively connected to the drive wheels, bell crank levers connected to the mower and having operative connection with the cutting mechanism to adjust the height of the same, and means to lock the bell crank levers to hold the cutting mechanism in adjusted positions.

27. A lawn mower comprising drive wheels, a cutting mechanism including a shear blade and a rotary cutter, a clutch gear connection between the wheels and the cutting mechanism, including an annular gear on each wheel, pinions carried by the axis of the rotary cutter and having mesh with the gears of the wheels, a toothed clutch member keyed on the axis of the rotary cutter adjacent each pinion, and a curved clutch dog pivoted intermediate its ends on the inner face of each pinion and having a plurality of teeth adapted to engage with the teeth of the respective clutch members under the influence of centrifugal action as the mower is propelled over the sward so as to operate the rotary cutter, and a handle for the mower.

28. A lawn mower comprising drive wheels, a cutting mechanism operatively connected to the drive wheels, means for adjusting the height of the cutting mechanism, a keeper supported on the mower, a spring controlled locking lever supported on the mower to co-act with the keeper to hold the cutter mechanism in adjusted positions, a propelling handle swingingly connected to the mower and having a recess therein, the outer end of said locking lever being located in said recess and having a transverse slot therein, and a pin passed transversely through the handle and said slot of the locking lever, whereby said adjusting means and said locking lever are controlled by the handle.

29. In a lawn mower, an axle, drive wheels on the axle, a cutting mechanism supported between the drive wheels and operatively connected to the latter, spaced bell crank levers located in the rear of the mower having operative connection with the cutting mechanism, a shaft connecting the bell crank levers and located in a plane above the axis of said axle, connections between the shaft and the axle for the support of the shaft and the bell crank levers, a sward roller carried by the bell crank levers, and a propelling handle connected to said shaft.

30. A lawn mower comprising drive wheels operatively connected together, a cutting mechanism adjustably supported between the drive wheels to cut grass of different lengths, a device to lock the cutting mechanism in adjusted positions, a handle movably connected to the mower adapted to propel and steer the mower, and connections operable between the handle and the cutting mechanism whereby upon movements of the handle the locking device may be tripped and said connections operated to adjust the cutting mechanism.

In testimony whereof I affix my signature.

JAMES L. MARTIN.

Copies of this patent may be obtained for five cents each, by addressing the "Commissioner of Patents, Washington, D. C."